Oct. 8, 1940.   M. TANZI   2,217,627
DIE FOR FORMING PLASTIC MATERIALS INTO THREADS OR RIBBONS
Filed Feb. 21, 1940   6 Sheets-Sheet 1
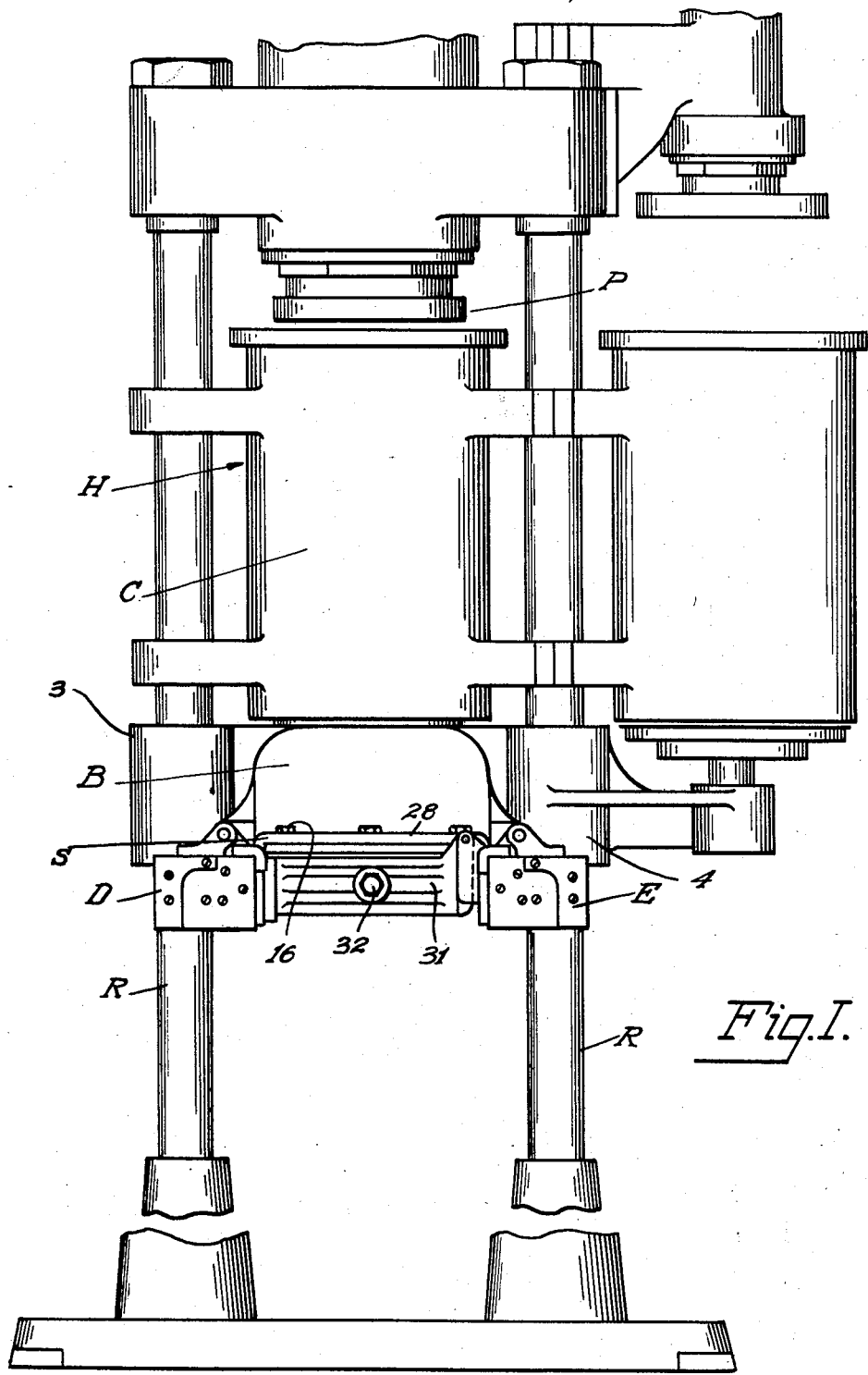
Fig.I.
Inventor:
Mario Tanzi
By C.P.Sofer
Atty.

Oct. 8, 1940.    M. TANZI    2,217,627
DIE FOR FORMING PLASTIC MATERIALS INTO THREADS OR RIBBONS
Filed Feb. 21, 1940    6 Sheets-Sheet 2
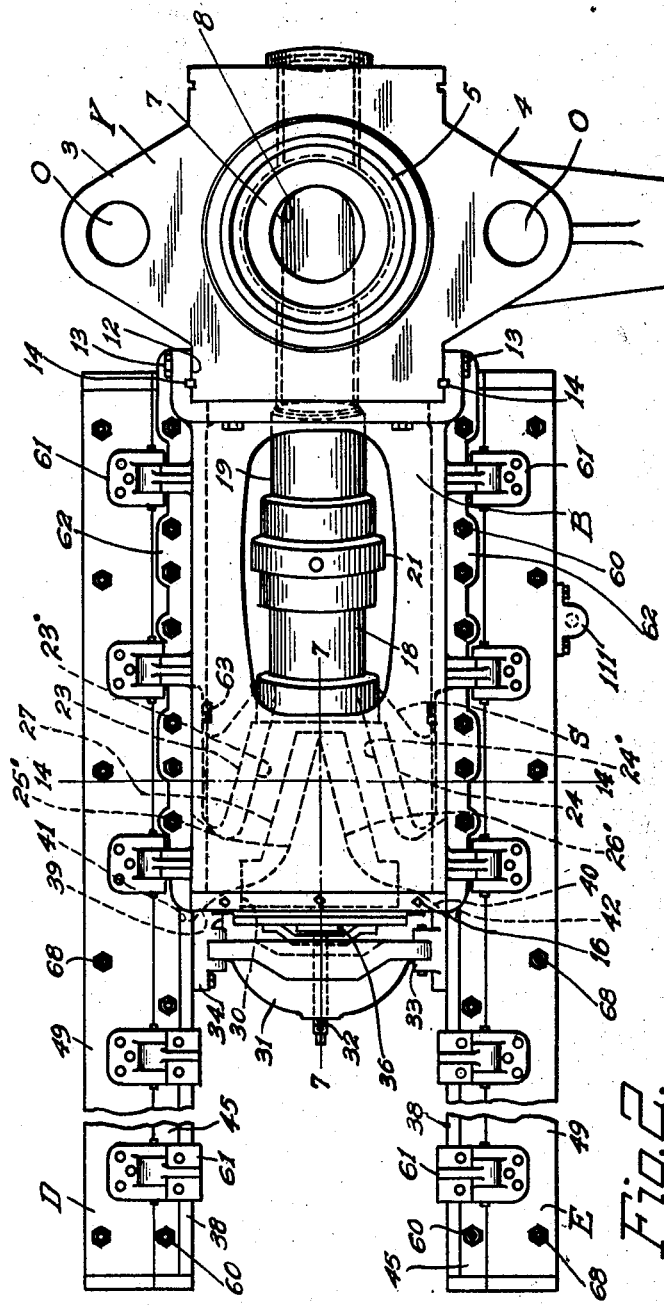
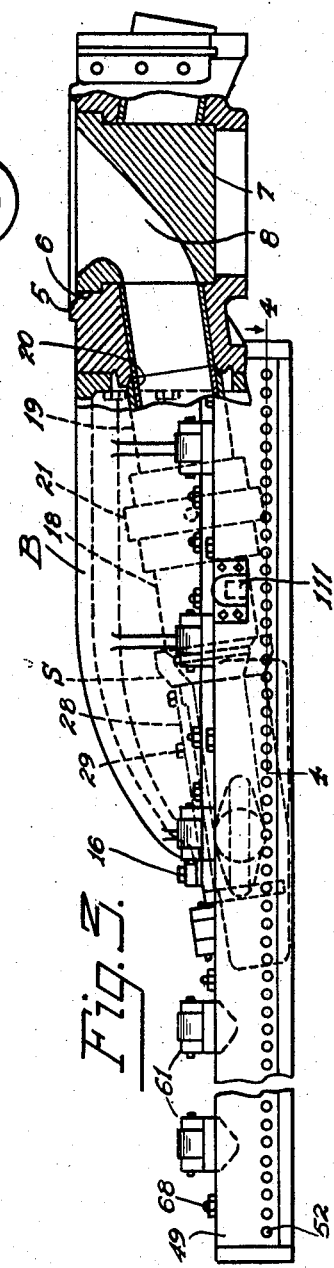
Inventor:
Mario Tanzi
By C. P. Sofer
Atty.

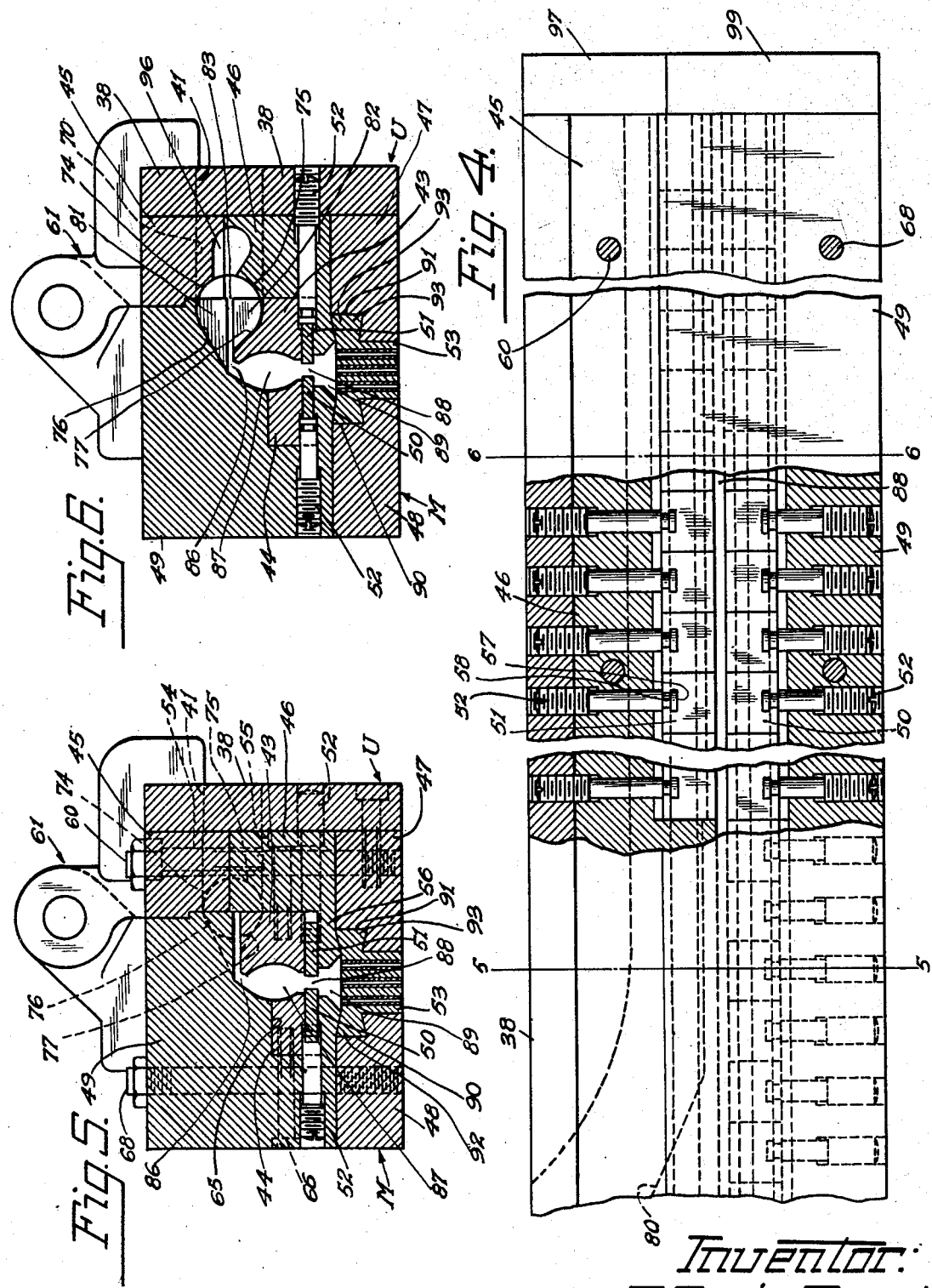

Oct. 8, 1940.  M. TANZI  2,217,627
DIE FOR FORMING PLASTIC MATERIALS INTO THREADS OR RIBBONS
Filed Feb. 21, 1940  6 Sheets-Sheet 4
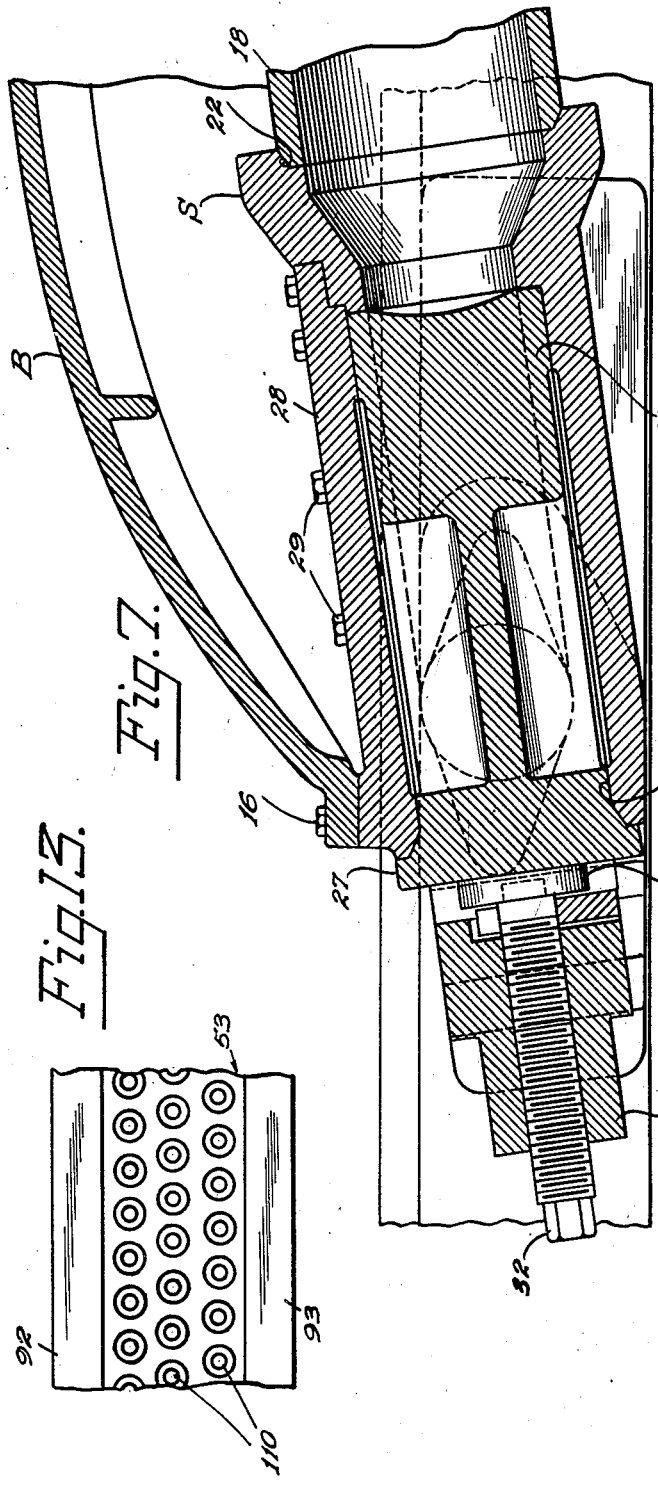
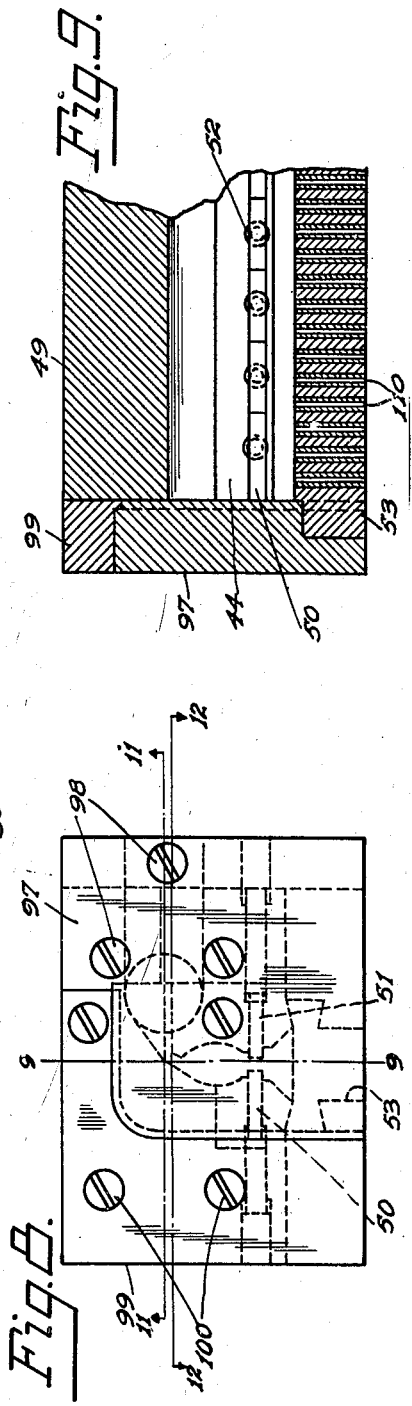
Inventor: Mario Tanzi
By C. C. Soper
Atty.

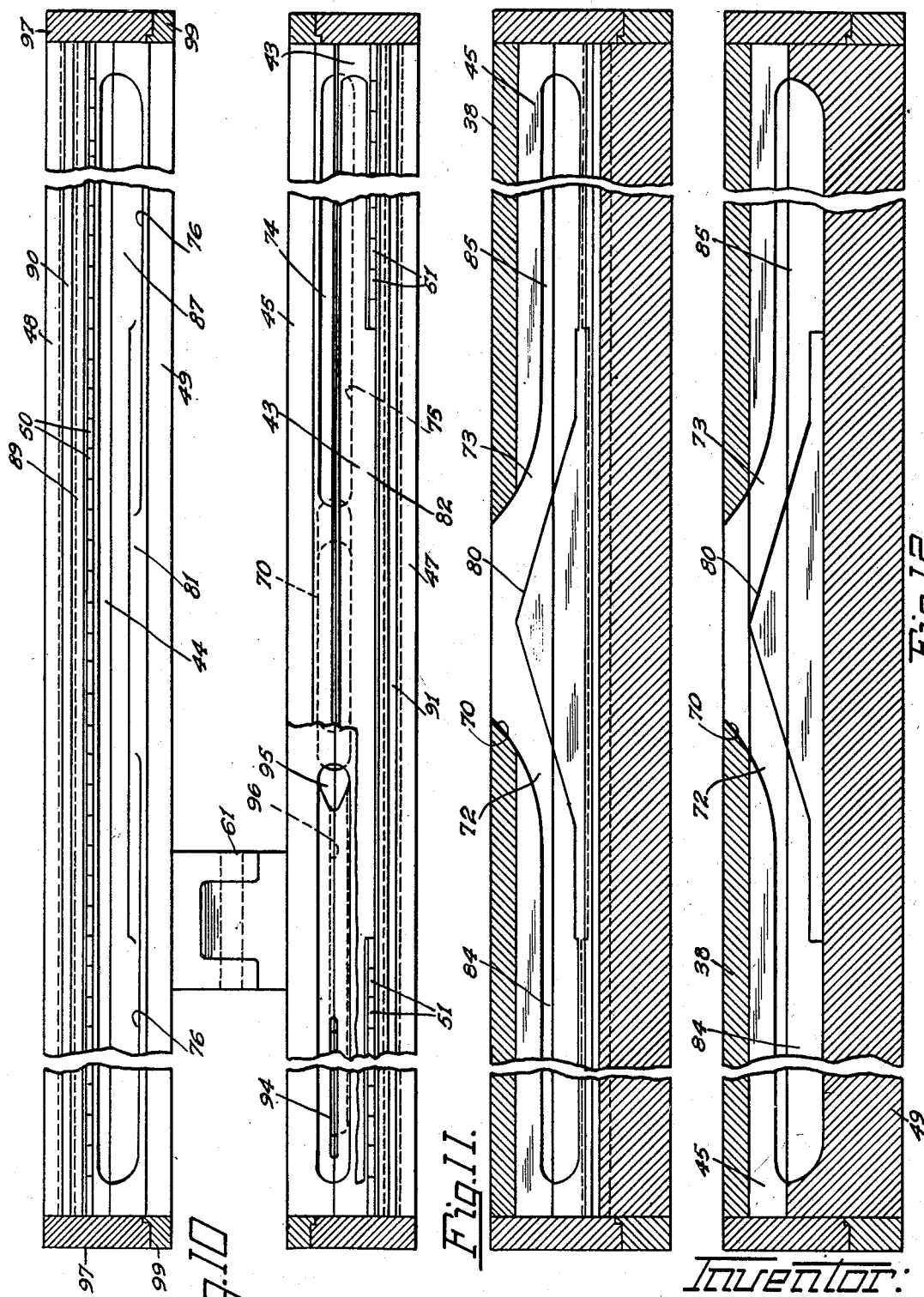

Oct. 8, 1940.   M. TANZI   2,217,627
DIE FOR FORMING PLASTIC MATERIALS INTO THREADS OR RIBBONS
Filed Feb. 21, 1940   6 Sheets-Sheet 6

Inventor:
Mario Tanzi.
By C. P. Soper
Atty.

Patented Oct. 8, 1940

2,217,627

UNITED STATES PATENT OFFICE 2,217,627

DIE FOR FORMING PLASTIC MATERIALS INTO THREADS OR RIBBONS

Mario Tanzi, Chicago, Ill., assignor to The John B. Canepa Company, Chicago, Ill.

Application February 21, 1940, Serial No. 320,059

20 Claims. (Cl. 107—14)

This invention relates to improvements in dies and paste distributing apparatus used in the manufacture of spaghetti and like paste products and is a modification of or improvement upon the device disclosed in applicant's application Ser. No. 259,579, filed March 3, 1939, and issued April 23, 1940, as Patent No. 2,197,988.

The manufacture of spaghetti can be carried on most advantageously if the strands are extruded from a horizontally disposed die in such a manner that the same will depend downwardly in close formation so as to form a substantially continuous sheet. It is also desirable that the strands issue from the die at substantially uniform speed throughout its length. As the die employed must necessarily be of considerable length, the horizontally extending passages in the die structure which receive the dough under pressure and deliver it to the die must be so constructed and proportioned as to deliver the paste to all parts of the die at substantially equal pressure.

As the dough used in making spaghetti is comparatively dry and therefore of relatively heavy consistency, it offers considerable resistance to travel along the passages of the die structure. In order that the dough may be fed to the die at uniform pressure throughout its length, it is necessary that the flow of the dough delivered to the passage above the spreader be retarded at points adjacent to the center of the die to a greater extent than at points remote from the center thereof.

The object of the invention is the provision of a spreader means, located between the pressure chamber and the die, whereby the dough is caused to be fed to the die at substantially uniform pressure throughout its length.

A feature of the invention resides in the provision of conducting means supported and positioned between the pressure chamber of the press and the die structure and a dividing unit in the form of a housing provided with diverging passages for conveying the dough received from the conducting means to the die structure.

Another feature of the invention resides in the provision of a wedge-shaped abutment which diverts the dough stream entering the die structure into diverging channels which communicate with passages extending toward the opposite ends of the die structures in combination with a restricted passage located centrally of the right and left passages which offer considerable resistance to the passage of the dough stream relative to the resistance offered by the right and left passages to insure a substantially uniform pressure throughout its length.

A further feature consists in means for forming an adjustable communicating slot between the passage immediately above the die and a second passage or channel located above the slot adjusting means. The slot adjusting means is formed by a plurality of diametrically opposite plates, so supported in the die structure that they may be separately adjusted toward or from each other. By this means, if it is found that the dough is being fed to a portion of the die, either too slowly or too fast, the adjustable plates can be readily adjusted toward or from each other to increase or decrease the width of the slot so as to secure uniform feeding of the dough to the die throughout its length.

Another feature resides in the provision of easily removable sections of the conducting passages or channels which convey the dough from the pressure chamber to the die structure. As the dough firmly adheres to the walls of the passages a short time after a run is stopped, it is desirable to provide easily removable sections to permit the ready cleaning of the passage.

A further feature of the invention resides in the provision of means, in the form of a stationary unit and a movable unit hingedly joined thereto, which form the die structure whereby the parts may be quickly and easily separated and the die removed therefrom to permit inspection and cleaning of the die and the cleaning of the channels of the two die units.

Other features and advantages of the die structure, not appearing above, will appear in the following description.

For a more complete understanding of the die structure and the operation of the invention, reference may be had to the following detailed description taken in connection with the accompanying drawings in which—

Fig. 1 is a front elevation of a typical hydraulic press showing the die structure of the invention operatively associated therewith;

Fig. 2 is a plan view of a pair of die structures and related parts by which the same may be operatively associated with the pressure chamber of the hydraulic press;

Fig. 3 is a side elevation of the structure illustrated in Fig. 2 with parts broken away;

Fig. 4 is a section on the line 4—4 of Fig. 3 looking in the direction of the arrow indicated thereon;

Fig. 5 is a section on the line 5—5 of Fig. 4;

Fig. 6 is a section on the line 6—6 of Fig. 4;

Figure 14:
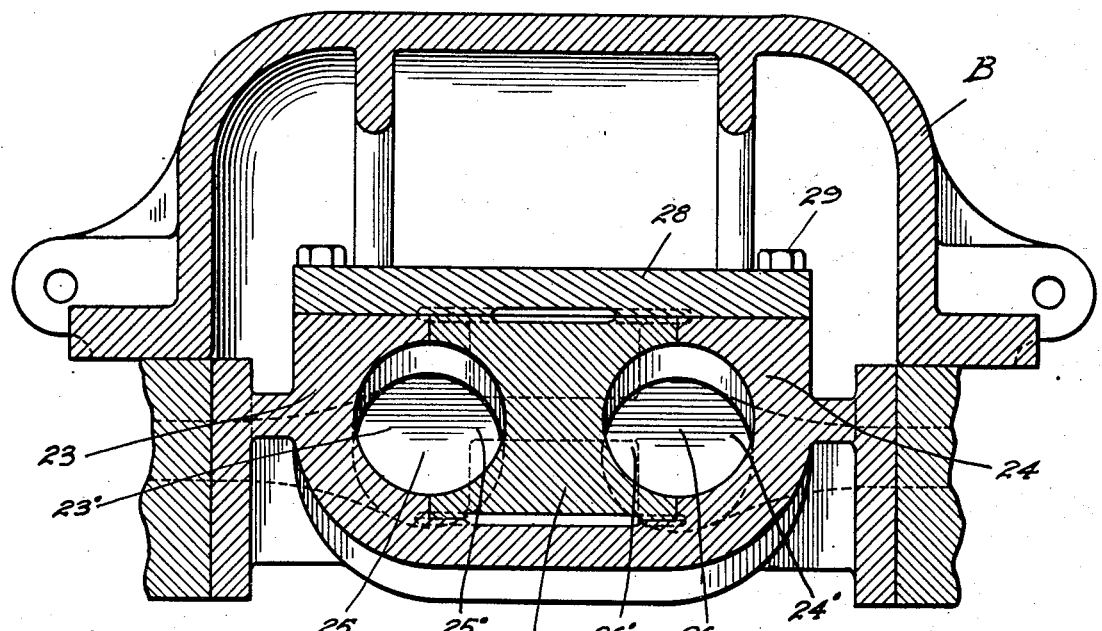
Figure 16:
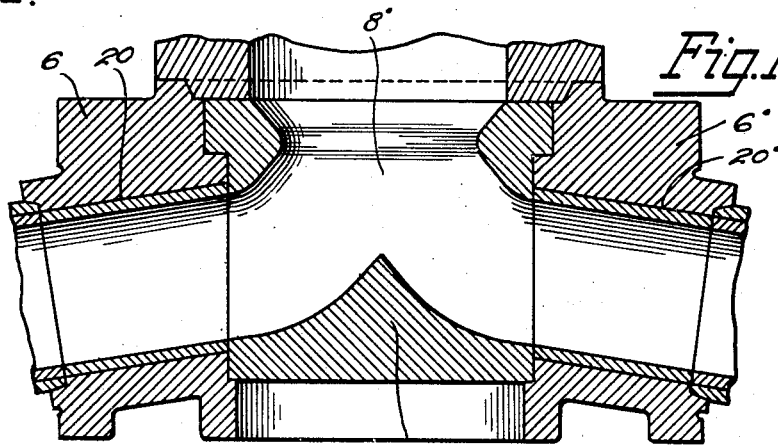
Figure 15:
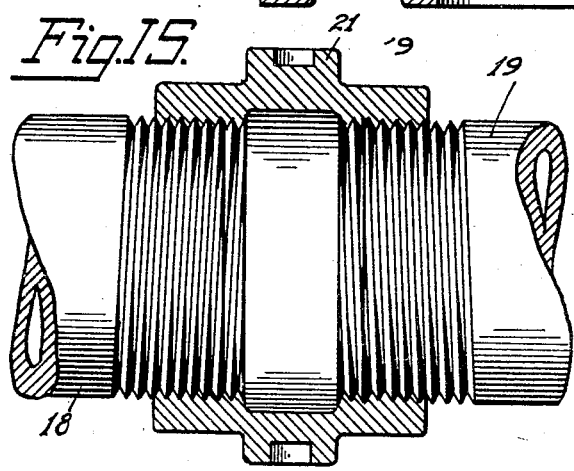

Fig. 7 is a section along the line 7—7 of Fig. 2;
Fig. 8 is an end view of the die structure;
Fig. 9 is a section on the line 9—9 of Fig. 8;
Fig. 10 is a view of the die structure in open position;
Fig. 11 is a section on the line 11—11 of Fig. 8;
Fig. 12 is a sectional view along the line 12—12 of Fig. 8;
Fig. 13 is a plan of a fragmentary portion of the die showing the arrangement of the holes or bores therethrough;
Fig. 14 is a section substantially on the line 14—14 of Fig. 2;
Fig. 15 is an enlarged view of the conducting pipes of Fig. 2, with parts broken away, showing the manner of uniting them; and
Fig. 16 is a sectional view similar to the right end of Fig. 3, but showing a modification in which provision is made for four dies, two being provided at each side.

Referring now to the accompanying drawings in which like reference characters in the several views denote like parts, the hydraulic press H illustrated in Fig. 1 is typical of the type now in general use for manufacturing spaghetti and similar paste products and comprises a pressure chamber C, which receives the paste or dough, and its associated pressure producing means in the form of a piston P, the movement of which is actuated by hydraulic pressure.

A spreader yoke Y (Fig. 2), operatively secured to the press H in any desired manner, has secured thereto a spreader supporting bracket B and connecting tubes which extend between the channel 8 in the yoke Y, and a spreader housing S which is secured to the forward end of the bracket B and which is provided with passages to conduct the paste or dough to the die structures D and E secured to the respective left and right sides of the bracket B, all of which will be more fully hereinafter described.

The spreader yoke Y is provided with oppositely disposed arms 3 and 4 provided with openings O which receive the vertically disposed rods R of the press H. Any desired securing means, such as bolts, may be provided for fastening the yoke to the press. An annular flange 5, formed on the top face of the yoke, fits into an annular groove in the bottom face of the dough chamber C, as illustrated in Fig. 1. A central opening 6 in the yoke Y receives a block 7 which is provided with an angularly disposed, downwardly extending passage 8 (Fig. 3) which extends from the pressure chamber C to the conducting channels leading to the die structures D and E.

The spreader supporting bracket B is provided at its rear end with a channel formation 12 which spans one side of the yoke Y and is secured thereto by bolts 13 and keys 14 positioned in the keyways in the bracket B and yoke Y as shown in Fig. 2. The bracket B extends outwardly from the yoke Y and supports, at its outer end, a spreader housing S which is positioned between the depending sides of the bracket B and is secured thereto by the bolts 16 (Figs. 2, 3 and 7). Passage 8 communicates with the cavity in the housing S through a sleeve 20 of a size to pass through the right and left tube members 18 and 19 which are in threaded engagement with right and left hand threaded portions of a lock nut 21. The ends opposite the threaded portions of the respective tubes 18 and 19 are slightly tapered and rest, respectively, in a like tapered portion in the opening of the channel 8 and opening 22 in the spreader housing S. As the nut 21 is rotated by a suitable spanner wrench or the like, the tubes 18 and 19 are moved from each other forcing the tapered ends of the same into the tapered portions of the respective openings in the housing and yoke to provide a seal against leakage and to rigidly support the sleeve 20.

The inner diverging side walls 23 and 24 of the housing chamber are provided with semi-circular channels 23' and 24' (Figs. 1, 2 and 14). A center wedge-formed member 27, adapted to fit into the housing S, is provided with semi-circular channels 25' and 26' in its respective sides which, when the wedge 27 is positioned in the housing as illustrated in Figs. 2 and 14, are placed in matched relation with the semi-circular channels 23' and 24' in the housing chamber to form a pair of diverging circular passages or ducts 25 and 26 terminating in diametrically opposite rectangular openings 39 and 40 as indicated in Fig. 2. The converging ends of the passages 25 and 26 are in direct communication with the rear opening 22 in the housing S for reception of dough or paste from the hydraulic press through conducting sleeve 20 as will be more fully described. A suitable cover 28 (Fig. 7) for the housing is secured thereto by means of bolts 29 and closes the housing S and seals it against leakage.

The forward end of the wedge 27 is rectangular in form and fits into a rectangular opening 30 (Figs. 2 and 7) in the housing S and suitable clamping means in the form of a clamping yoke 31 and pressure screw 32 maintains the wedge 27 in position in the housing S. The clamping yoke 31 is pivoted at its one end in a bracket 33 integral with the bracket B and its other end fits into a slot formed in a lug 34 secured to the bracket B (Fig. 2). The pressure screw 32 is in threaded engagement with the yoke 31 and has its end contacting the wedge through the medium of a washer or wear plate 36. As the screw is turned down, the wedge is forced into position in the housing to maintain the same immovable. This also forces the rectangular portion of the wedge 27 into the rectangular opening 30 of the housing to prevent leakage of the dough or paste as it is forced through the diverging passages 25 and 26.

The respective diverging passages broaden laterally and inwardly and contract vertically and inwardly to form rectangular openings 39 and 40 and these rectangular, horizontal openings are in matched relation with similar shaped openings 41 and 42 in the back plates of the respective die structures. The dough or paste from the hydraulic press is forced through the conducting passage or sleeve 20 and passes through the duct 22 in the housing S into the diverging passages 25 and 26 and thence to the rectangular openings 41 and 42 in the right and left die structures as indicated in Fig. 2.

As the die structures D and E are identical in construction, only the die structure D will be described in detail.

The die structure in general comprises a back plate 38, (Figs. 5 and 6) rear and front insert blocks 43 and 44, rear upper and lower blocks 45 and 46, rear and front gibs 47 and 48, a front block 49, a plurality of aligned front and rear adjustable plates 50 and 51, adjusting screws 52 positioned in threaded openings in the front block 49 and rear lower block 46 are linked with the adjustable plates 50 and 51 to individually control the adjustment of the same and a die 53, positioned between the front and rear gibs. These various blocks and inserts are provided with slots or channels of varying widths and depths to form passages which when assembled, as the completed die structure D, form passages for the equal distribution of the dough to the die 53 throughout its length.

The rear stationary unit U of the die structure D comprises the rear upper block 45 and the rear lower block 46 which are secured together by means of the screws 54 passing through openings in the upper rear block and having threaded engagement with tapped openings in the lower rear block 46 and which are in turn secured to the back plate 38 by means of suitable screws. The rear insert block 43 associated with the stationary unit is secured to the lower rear block 46 by means of the screws 55 (Fig. 5) and the rear gib 47, which is also a part of the stationary unit U, is secured to the back plate 38 by means of suitable screws.

The upper face of the extended portion 56 of the lower rear block 46 is in spaced relation to the lower or bottom face of the rear insert 43 to form a rectangular channel extending the length of the die which is adapted to receive a plurality of like adjusting plates 51. The rear edge of each plate 51 is provided with a centrally positioned, T-shaped slot 57 (Fig. 4). Each adjusting screw 52 is provided with a T-shaped end formation 58 adapted to fit into the T-shaped slot of a plate 51. The threaded ends of the adjusting screws 52 are in threaded engagement with tapped openings in the rear plate 38. Turning the screw clockwise or counter-clockwise causes movement of the plate forward or back thus providing means for individually adjusting any one of the plurality of plates 51.

A plurality of clamping bolts 60 pass through aligned openings in the rear upper block 45 and lower blocks 46 and have threaded engagement in the tapped openings in the rear gib 47, and thus provide means for clamping these parts together to form the stationary unit U (Figs. 5 and 6) of the die structure D and also provide means to secure the stationary unit to the bracket B. The upper threaded ends of the bolts 60, adjacent to bracket B, pass through openings in the lateral flange 62 (Fig. 2) of the bracket B. Nuts threaded to the tops of bolts 60 secure the stationary unit U to the bracket. Bolts 63, passing through openings in the depending sides of the bracket and in threaded engagement with back plate 38, provide additional means to secure the die unit U to the bracket B.

The movable unit M (Figs. 5 and 6) of the die structure D comprises the front block 49 which is provided with a U-shaped slot 65 adapted to receive the front insert 44 which is secured thereto by means of the screws 66 and is positioned therein so as to form between the bottom face of the insert 44 and the bottom of the U-shaped slot a rectangular shaped channel adapted to receive the front adjustable plates 50 which may be individually adjusted by means of the adjusting screws 52. As these plates and their associated adjusting screws are similar in construction to those associated with the stationary unit, a further description is not necessary.

Clamping bolts 68 passing through openings in the block 49 have threaded engagement with tapped openings in the front gib 48. The upper threaded ends of the bolts 68 extend above the block and nuts, in threaded engagement with the bolt, clamp the block and gib together to form the movable unit M. Hinges 61, secured respectively to the stationary and movable units, provide means to permit the movable unit to be moved relative to the stationary unit for purposes which will presently be described.

The upper and lower blocks 45 and 46 of the stationary unit U, midway between their respective ends, are provided with channels which, when these blocks are secured together as previously described, form a rectangular opening 70 which registers with the opening 41 in the back plate 38 of the unit U. The elongated opening 70 terminates in circular diverging right and left passages 72 and 73, formed by the arcuate-shaped channels 74 and 75 in the upper and lower rear blocks 45 and 46, the arcuate shaped channel 76 in the front block 49 and the arcuate shaped channel 77 of the rear insert block 46 (see Fig. 6). the diverging passages 72 and 73 (Fig. 11) formed by the matched channels of the blocks 45 and 49 and insert 43 receive dough from the opening 70 and an abutment 80, opposite the said opening, tends to split the dough stream and deflect it into the diverging passages 72 and 73.

Abutments or baffles 81 and 82 (Figs. 6 and 10) extend proportionate distances to the right and left in the arcuate channels 76 and 77 formed in the front block 49 and rear insert 46 and are in spaced relation when the units U and M are connected in operative relation, so they form, therebetween, a narrow slot 83 (Fig. 6) of large horizontal area extending the length of the abutments. This narrow slot 83 communicates with the passages 84 and 85 which are continuations of the diverging passages 72 and 73 and which extend to the right and left to the respective ends of the die structure. Slot 83 offers a much greater resistance to the passage of dough therethrough than do the passages 84 and 85. Thus, it will be apparent that the passage of dough from the passages 84 and 85 into the slot 83 is restricted to a much greater extent centrally than at points to the right and left of the slot and adjacent to the ends of the passages.

The rear arcuate-shaped portions of the passages 84 and 85 converge forwardly to form a restricted passage 86 (Fig. 5) which communicates with an elliptical shaped passage or cavity 87 formed by the arcuate-shaped side of the rear insert 43 and matched arcuate-shaped channel in the front block 49 and front insert 44 and the flow of the dough from the elliptical-shaped opening 87, which extends the length of the die structure, is controlled by the adjustment of the diametrically opposite adjustable plates 50 and 51 in the movable and stationary units M and U which form a passage 88, therebetween, through which the dough passes to the die proper.

The passage 88 formed by the movable or adjustable plates 50—51 communicates with a cavity 89 provided with diverging sides formed by the downwardly flared faces of the lower edges of the respective front and lower rear blocks 49 and 45. The bottom faces of the front and rear blocks 49 and 45 adjacent the flared faces are angularly disposed as are also the top faces of the lug extensions of the front and rear gibs 47 and 48. The angular faces of the front block 49 and gib 48 and rear lower block 46 and gib 47 from diametrically opposite dovetailed slots 90 and 91 extending the length of the units M and U (Figs. 5 and 6). The die 53 is provided with diametrically opposite dovetail projections 92 and 93 which are adapted to fit into the dovetailed slots 90 and 91. This provides means to accurately position the die 53 when the movable and stationary units are placed in closed position as well as to prevent downward movement of the die which subject the dough pressure. The dovetailed extensions of the die 53 in association with the dovetailed slots, just above described, provide means to lock the movable and stationary die units together to form a unitary die structure whenever the pressure of the dough is applied to the die.

An elongated slot 94 in the passage 84 adjacent to its end and an elliptical opening 95 (Fig. 10) forward of the restricted slot 83 (Fig. 6) are connected by means of a channel 96. Similar openings and their connecting channel are provided to supply dough to the other end of die. This auxiliary channel 96 is a sort of by-pass about the restricted slot 83 and conveys dough directly to the ends of the die in addition to that delivered by the main passages 84 and 85. These two means of distribution tend to balance each other and insure that the dough will be delivered to the ends of the die at substantially the same pressure as centrally thereof.

The respective ends of the stationary unit are capped by end plates 97 secured thereto by means of the screws 98 and the respective ends of the movable unit are capped by means of end plates 99 (Fig. 10) secured thereto by means of the screws 100 (Fig. 8). The edges of the plates 97 are provided with ribs which fit into suitable cutouts in the edges of the end plates 99, when the stationary and movable units are locked in position as above described, to provide sealing means for the respective ends of the die structure.

The die structure E is also secured to the center spreader bracket B in the same manner as the die structure D and as the construction is identical to that of the die structure, just described in detail, its structure and operation will be readily understood.

The die 53 is of considerable length and it is, therefore, necessary to provide means to distribute the dough or mix forced from the pressure chamber of the hydraulic press, so it will be delivered to the die 53 substantially equally throughout its length. For a more complete understanding of the operation of the die structure in obtaining an equal distribution of the dough, the travel of the dough from the hydraulic press to the spreader die will now be described.

The mix or dough issuing from the pressure chamber C passes through yoke passage 8 and enters the sleeve 20 extending through the tubes 18 and 19. From the sleeve 20, the dough enters the housing chamber S and passes through the diverging passages 25 and 26 in the housing and continues through the elongated matched openings 41 and 70 in the housing and back plate of the die structures D. As the dough is distributed to the die in each die structure in a like manner, a description of the dough distribution in the die structure D will suffice for a clear understanding of both.

As the dough passes through the opening 70 (Fig. 11), the triangular abutment 80 deflects the dough to the right and left into the diverging passages 72 and 73 and continuing therethrough, the dough enters the passages 84 and 85 extending to the respective ends of the die structure. The restricted horizontal slot 83 formed by the horizontally disposed abutments 81 and 82 communicates with the passages 84 and 85 to the right and left of the slot 83. The dough entering this horizontal restricted slot 83 offers a much greater resistance to the passage of the dough therethrough and the dough, therefore, retarded to a much greater extent centrally thereof than at points beyond the restricted slot. The dough now passes through the passage 86 and enters the elliptical passage 87. The elliptical passage 87 communicates with the substantially triangular shaped passage 89 above the die 53 through a slot 88 formed by the respective edges of the horizontally positioned adjustable plates 50 and 51 in the movable and stationary units of the die structure. The corresponding plates 50 and 51 in the movable and stationary units may be easily adjusted with precision toward or from each other, by turning the adjusting screws 52 to regulate the width of the slot 88. Thus, the flow of dough through the slot 88 into the channel 89, which overlies the die, can be accurately controlled throughout the length of the die.

The openings 95 in the passages 84 and 85, positioned adjacent to the restricted slot 83, and the elongated slots 94 adjacent to the respective ends of the passages 84 and 85, are connected by the channels 96. Thus, dough entering the passages 84 and 85 also passes through the openings 95 and continues through the channels 96 and through the elongated slots 94 again entering the passages 84 and 85 adjacent to the ends thereof. This auxiliary dough stream insures an adequate, as well as positive, supply of dough in addition to the main flow through the passages 84 and 85 to the extreme ends of the die.

From the above description it is evident that the dough stream is subjected to much greater retardation when passing through the centrally positioned, restricted slot 83 than while passing through the passages 84 and 85 to the right and left of the restricted slot. Thus, the passage of the dough is retarded to a much greater extent centrally of the die structure than at points remote from the center thereof.

In Fig. 13 the arrangement of the holes or bores 110 in the die 53 are shown. It will be noted that three rows of the bores 110 are closely adjacent to each other and that the bores in the rows are in staggered relation to each other. Thus, when the threads of spaghetti, macaroni or the like, issuing from the bores 110, are folded over a supporting rod, the threads lie close together so as to form a practically continuous surface.

When the movable and stationary unit of the die structure is locked, by the die 53, into a rigid unit, as before described, if it is desired to separate the units for the purpose of cleaning the internal passages, the forward end plate 97 of the stationary unit is removed permitting the die 53 to be withdrawn from the dovetailed supporting slots 90 and 91. A pair of brackets 111 secured to movable unit U and provided with an opening adapted to receive suitable bars which may serve as handles to swing the movable unit upward about the hinges until the desired parts are accessible.

When it is desired to return the movable unit M to operative position, it will be rotated downwardly until its dovetailed slot 90 is positioned opposite the dovetailed slot 91 in the stationary unit. The die 53 may now be fitted into the respective slots and forced into position to again lock the movable and stationary units together. The end plate 97 is again secured in position by the screws and the structure will again be ready for operation.

If it is desired to remove the wedge 27 from the housing S for the purpose of cleaning the diverging passages, the yoke pressure screw 32 is rotated in a counter-clockwise direction permitting the clamping yoke 31 to be swung about its pivot so the wedge 27 may be removed. The housing cover 28 may also be removed to permit access to the housing. The connecting sleeve 20 between the housing S and the yoke opening 6 may also be removed for cleaning purposes by rotating the lock nut 21 to permit removal of the sleeve. After cleaning, the wedge may again be inserted in the housing and maintained in position by the clamping screw and yoke as previously described. The sleeve may also be again secured in position by the rotation of the lock nut.

In Fig. 16 is shown a modification employed when it is desired to employ four separate dies 53. The block 7' will be substituted for the block 7 of Fig. 3. Block 7' will divide the stream of dough issuing from the pressure chamber, part of it passing from the cavity 8' into liner 20, as previously described, while the other part will pass into liner 20' and thence on to the second pair of dies in the same manner as hereinbefore described. As shown in Fig. 2, the yoke Y is symmetrically formed so that a second member, as the bracket B of Fig. 2, may be secured thereto through the medium of a yoke 12, in an obvious manner. As the flow of dough or like material, through the various passages and conduits is greatly retarded by an increase in back pressure, it will be found that, when four dies are employed, the dough will be fed to each of them under substantially the same pressure so that, by adjustment of the slots 88, the product will be extruded from all four dies at substantially equal speed.

While in the drawing and the above description a preferred embodiment of the invention is disclosed, it is to be understood that modifications thereof may be made without departing from the scope of the invention. The invention should therefore be limited only by the scope of the appended claims.

Having thus described my invention, what I claim as new and desire to secure by Letters Patent of the United States is:

I claim:

1. In a device of the class described, a pressure chamber, a conduit leading therefrom, a housing supporting said conduit, diverging arms in which said housing terminates, said arms being formed with grooves in the opposed faces thereof, and a wedge-shaped baffle member positioned between said arms, said baffle member being formed in its remote faces with grooves which, when said member is in position, are opposed to the grooves in said arms, respectively, to form diverging channel extensions of said conduit.

2. In a device of the class described, a pressure chamber, a conduit leading therefrom, a housing supporting said conduit, diverging arms in which said housing terminates, said arms being formed with grooves in the opposed faces thereof, a wedge-shaped baffle member positioned between said arms, said baffle member being formed on its remote faces with grooves which, when said member is in position, are opposed to the grooves in said arms, respectively, to form diverging channel extensions of said conduit, and means detachably securing said member in position whereby said baffle member may be removed to permit cleaning of said conduit and channels.

3. In a device of the class described, a pressure chamber, a conduit leading therefrom, a housing supporting said conduit, diverging arms in which said housing terminates, said arms being formed with grooves in the opposed faces thereof, a wedge-shaped baffle member positioned between said arms, said baffle member being formed on its remote faces with grooves which, when said member is in position, are opposed to the grooves in said arms, respectively, to form diverging channel extensions of said conduit, a yoke, means pivotally joining one end of said yoke to said housing, an abutment on said housing for engaging the other end of said yoke and a screw threaded through said yoke and engaging said baffle member.

4. In a device of the class described, a pressure chamber, a conduit leading therefrom, a housing supporting said conduit, diverging arms in which said housing terminates, said arms being formed with grooves in the opposed faces thereof, a wedge-shaped baffle member positioned between said arms, said baffle member being formed on its remote faces with grooves which, when said member is in position, are opposed to the grooves in said arms, respectively, to form diverging channel extensions of said conduit, a yoke removably connected to said housing and pressure screw threaded through said yoke and engaging said baffle member.

5. In a device of the class described, a die support, separable sections forming said support, an elongated die carried by said support between said sections, dovetailed extensions at the opposite edges of said die, the opposing edges of said sections being provided with like dovetailed recesses adapted to receive the dovetailed extensions on said die whereby said sections are retained in operative relation each to the other.

6. In a device of the class described, a die support, separable sections forming said support, means at one side of said sections for detachably securing them together, an elongated die carried by said support between said sections, dovetailed extensions at the opposite sides of said die, the opposing edges of said sections remote from said means being provided with like dovetailed recesses or grooves adapted to receive the dovetailed extensions on said die whereby said sections are retained in operative relation each to the other.

7. In a device of the class described, a die support, separable sections forming said support, hinges uniting said sections at adjacent edges, an elongated die carried by said support between said sections, dovetailed extensions at the opposite sides of said die, the opposing edges of said sections remote from said hinges being provided with like dovetailed recesses or grooves adapted to receive the dovetailed extensions on said die whereby said sections are retained in operative relation each to the other.

8. In a device of the class described, a die support, separable sections forming said support, means uniting said sections at adjacent edges, an elongated die carried by said support between said sections, dovetailed extensions at the opposite sides of said die, the opposing edges of said sections remote from said means being provided with like dovetailed recesses or grooves adapted to receive the dovetailed extensions on said die whereby said sections are retained in operative relation each to the other.

9. In a device of the class described, a pressure chamber, a die support, an elongated die carried by said support, an elongated cavity in said support adjacent to said die, a conduit joining said pressure chamber to said channel, a baffle between said cavity and said die, said baffle being formed of two series of like plates arranged with the opposing edges of the plates of one series in spaced relation to the adjacent edges of the plates of the other series so as to form a slot therebetween and means for independently adjusting the plates of either of said series toward or from the plates of the other series so as to adjust the width and position of the said slot.

10. In a device of the class described, a pressure chamber, a die support, an elongated die carried by said support, a channel in said support adjacent to said die, a conduit joining said pressure chamber to said channel, a baffle between said channel and said die, formed of two series of like plates arranged with the opposing edges of the plates of one series in spaced relation to the adjacent edges of the plates of the other series so as to form a slot therebetween and means operable exteriorly of said die and support for independently adjusting the plates of either of said series toward or from the plates of the other series so as to adjust the width and position of the said slot.

11. In a device of the class described, a pressure chamber, a die support, an elongated die carried by said support, a channel in said support adjacent to said die, a conduit joining said pressure chamber to said channel, a baffle between said channel and said die, adjustable sections of which said baffle is formed arranged to provide a slot therebetween and means for adjusting the said sections so as to vary the width and lateral position of the said slot.

12. In a device of the class described, a pressure chamber, a die support, a die carried by said support, a channel in said support adjacent to said die, a conduit joining said pressure chamber to said channel, a baffle between said channel and said die, formed of plates arranged with their opposing edges in spaced relation so as to provide a slot therebetween and means for independently adjusting either of the said plates toward or from the other so as to vary the width and position of the said slot.

13. In a device of the character described, a pressure chamber, an elongated die, a conduit comprising a series of channels for conducting dough or other material from said chamber to said die, an adjustable baffle in said conduit adjacent to said die and a fixed baffle in said conduit remote from said die and arranged to retard the flow of dough from said chamber to said die centrally thereof.

14. In a device of the character described, a pressure chamber, a support fixed thereto, an elongated die carried by said support, a conduit comprising a series of channels for conducting material from said chamber to said die, a pair of baffles in said conduit arranged to retard the flow of dough from said chamber to said die centrally thereof, one of said baffles being fixed, adjustable plates forming the other baffle and means operable exteriorly of said die and support for adjusting said plates.

15. In a device of the character described, a pressure chamber, a support fixed thereto, an elongated die carried by said support, a conduit comprising a series of channels for conducting dough or other material from said chamber to said die, a fixed baffle in said conduit remote from said die, an adjustable baffle in said conduit adjacent to said die and means operable exteriorly of said support and die for adjusting said adjustable baffle, said baffles being arranged to retard the flow of dough from said chamber to said die centrally thereof.

16. In a device of the character described, a pressure chamber, a support fixed therewith, an elongated die carried by said support, a conduit comprising a series of channels for conducting dough from said chamber to said die, a baffle comprising adjustable sections in said conduit adjacent to said die, means operable exteriorly of said die for adjusting said sections and a fixed baffle in said conduit remote from said die said baffles being arranged to retard the flow of dough from said chamber to said die centrally thereof.

17. In a device of the class described, a pressure chamber, a housing, a wedge-shaped abutment located in said housing adjacent to the exit from said chamber and cooperating with said housing to form a pair of divergent channels, a wedge-shaped baffle in each of said divergent channels, each of said baffles operating to divide its respective channel into two conduits, dies at which said conduits, respectively, terminate and distributing means in each of said conduits.

18. In a device of the class described, a pressure chamber, a housing, a wedge-shaped abutment located in said housing adjacent to the exit opening from said chamber and cooperating with said housing to form a pair of divergent channels, a wedge-shaped baffle in each of said divergent channels, each of said baffles operating to divide its respective channel into two conduits, dies to which said conduits, respectively, extend, distributing means in each of said conduits and an adjustable baffle overlying each of said dies.

19. In a device of the class described, a pressure chamber, an elongated die, an elongated cavity overlying said die and adjacent thereto, a conduit comprising a plurality of channels arranged to conduct material from said chamber to said cavity, a restricted portion in one of said channels for diverting said material toward the ends of said cavity and a by-pass channel extending about the said restricted area and communicating with said cavity adjacent to the end thereof.

20. In a device of the class described, a pressure chamber, an elongated die, an elongated cavity overlying said die and adjacent thereto, a conduit, including a pair of divergent channels, arranged to conduct material from said chamber to said cavity, restricted areas in each of said channels and a pair of by-pass channels extruding about the restricted areas in the channels of said pair, respectively, and communicating with said cavity adjacent to the ends thereof.

MARIO TANZI.